No. 644,576. Patented Mar. 6, 1900.
J. F. BRADY.
PNEUMATIC TIRE FOR VEHICLE WHEELS.
(Application filed Dec. 19, 1898.)

(No Model.)

WITNESSES:
H. H. Hale
A. O. Clark

INVENTOR:
John F. Brady.
By his atty,
Oscar Snell

UNITED STATES PATENT OFFICE.

JOHN F. BRADY, OF CHICAGO, ILLINOIS.

PNEUMATIC TIRE FOR VEHICLE-WHEELS.

SPECIFICATION forming part of Letters Patent No. 644,576, dated March 6, 1900.

Application filed December 19, 1898. Serial No. 699,681. (No model.)

*To all whom it may concern:*

Be it known that I, JOHN F. BRADY, a citizen of the United States, residing at Chicago, in the county of Cook and State of Illinois, have invented a new and useful Improvement in Pneumatic Tires for Vehicle-Wheels, of which the following is a specification.

My invention relates to pneumatic tires for vehicles; and my object is to provide means whereby the liability to puncture is reduced to the minimum, the construction whereby this object is attained being described hereinafter and illustrated in the accompanying drawings, in which—

Figure 1:
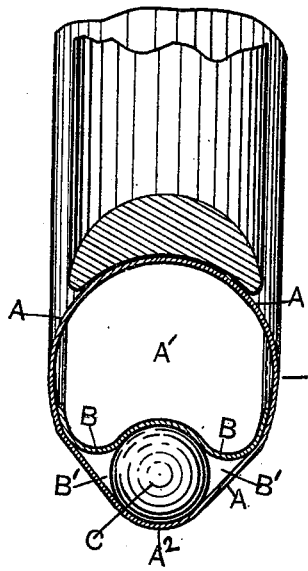
Figure 2:
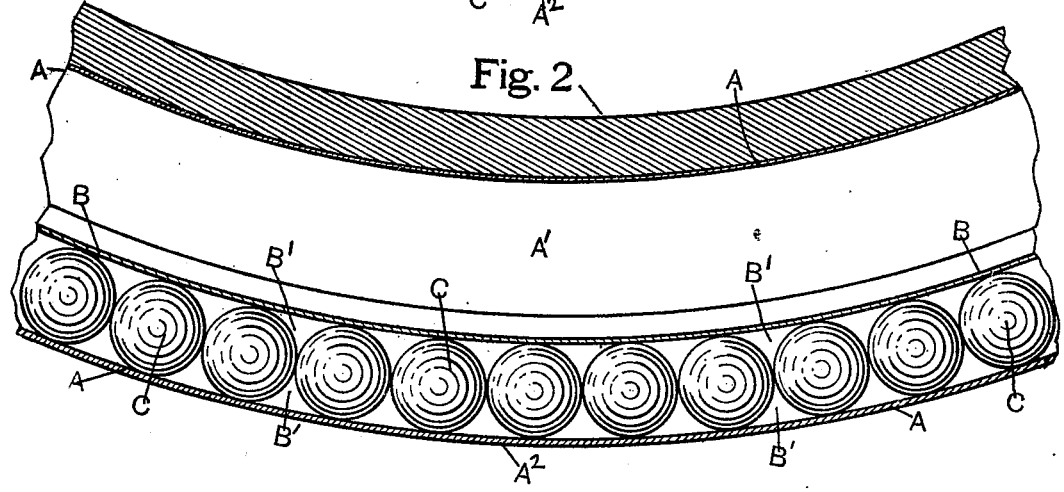

Figure 1 is a cross-section showing a portion of a felly and of the main body portion of a pneumatic tire in elevation. Fig. 2 is a vertical central section of a portion of a felly for a vehicle-wheel with a portion of a double-tube construction for a tire mounted thereon, the outside or tread tube containing a series of spheres which are shown in elevation in position for service.

Similar letters indicate like parts throughout both views.

The main tube of the tire in this instance forms the main outer wall A and is so constructed that it is adapted to withstand a high internal-air pressure and the rough usage incident to the service required of tires of this kind. The interior of the main body portion of this tire is divided into two longitudinal and separate chambers A' and B' by means of a longitudinal partition B. This partition is of a proper dimension and is so disposed as to lie snugly against the inner surface of the tread when the spherical members, hereinafter referred to, are not in place, and its opposite edges are in permanent relation with the main tube, preferably at approximately diametrically opposite points. Chamber A' is subjected to the air-pressure ordinarily required in this class of tires; but chamber B' is filled with air at the normal pressure, and partition B is prevented from being forced outwardly into contact with the inside walls of the tread portion $A^2$ of the tire by means of the series of spheres C, which are disposed entirely around the tire and partially fill chamber B', as shown.

It is obvious that the spheres C are adapted to hold the partition B at such a distance from the tread $A^2$ that should this tread portion be punctured it would not be likely to involve the wall of the tire or the partition B, which are under pressure, and it is also obvious that a puncture leading into the chamber B' would have little or no effect in disabling the tire, since the air-pressure in the ball-chamber B should never be greater or but slightly greater than the surrounding atmosphere. I prefer to fill the chamber B' with spheres of such a size that a space is left at each side of the spheres, as shown in Fig. 1. Spherical-shaped bodies like C are preferred to other forms, for the reason that they readily move under lateral pressure or are more like a liquid in their action and are thus better adapted than a solid filling or a filling comprising a series of segments which really fill the chamber B in some instances. By making the partition long enough in cross-section to engage with and partially encircle each side of the row or series of balls or spheres the spheres are prevented from moving laterally and remaining permanently out of line with each other, as the pressure of the partition will force them back into line after they have been forced to one side or the other by striking against an obstruction in the road. The oval shape of the tire, caused by my construction, presents a very small portion of the tire to the road, thereby making the tire run more easily and smoothly than it would if the tire were circular in cross-section—that is to say, the spherical bodies or balls C are designed to constitute a substantially-longitudinal continuous backing for the tread to give the tire the easy springy properties resulting from the pneumatic feature and at the same time affording next to the tread a chamber out of communication with the chamber containing air under pressure, so that a puncture through the tread will not cause the escape of air under pressure. Further, it will be noted that the partition B, constructed and arranged as described, will, when elevated from the tread by the interposition of the spherical bodies or balls, be located between air-spaces which permit of considerable lateral movement of the balls when they are brought into contact with an obstruction—that is to say, each individual ball of the series will be movable practically in all directions, so that instead of a solid resistance being opposed—as, for instance, to a stone or other obstacle—the ball will not only be pressed back against the resistance of the air within the inner chamber, but will also be capable of a quick lateral or sidewise motion, which will tend to prevent puncturing of the tire which might otherwise be occasioned. It should be noted, however, that as the partition B drops upon opposite sides of the ball by reason of the air-pressure exerted upon its unsupported portions the balls will be immediately returned to their positions in longitudinal alinement as soon as the obstacle which has caused their disalinement has been passed.

In practice the spheres C would usually be made hollow in order to reduce their weight, and it is not absolutely necessary, should they be made hollow, that the sides thereof be air-tight or inclose an air-space under a pressure greater than that of the surrounding atmosphere.

I claim as my invention—

The combination, with a tire, oval in cross-section and provided with a partition dividing the interior into an inflatable and a non-inflatable portion, the non-inflatable portion forming the periphery or apex of the oval, of a single row or series of normally-compressible spheres loosely placed in the non-inflatable portion of the tire, and means for inflating the inflatable portion, the partition engaging with the inner peripheries and partially encircling the sides of the spheres and preventing permanent lateral displacement of the spheres when the tire is inflated.

JOHN F. BRADY.

Witnesses:
ALONZO C. BOSS,
GEORGE H. BRAYTON.